UNITED STATES PATENT OFFICE.

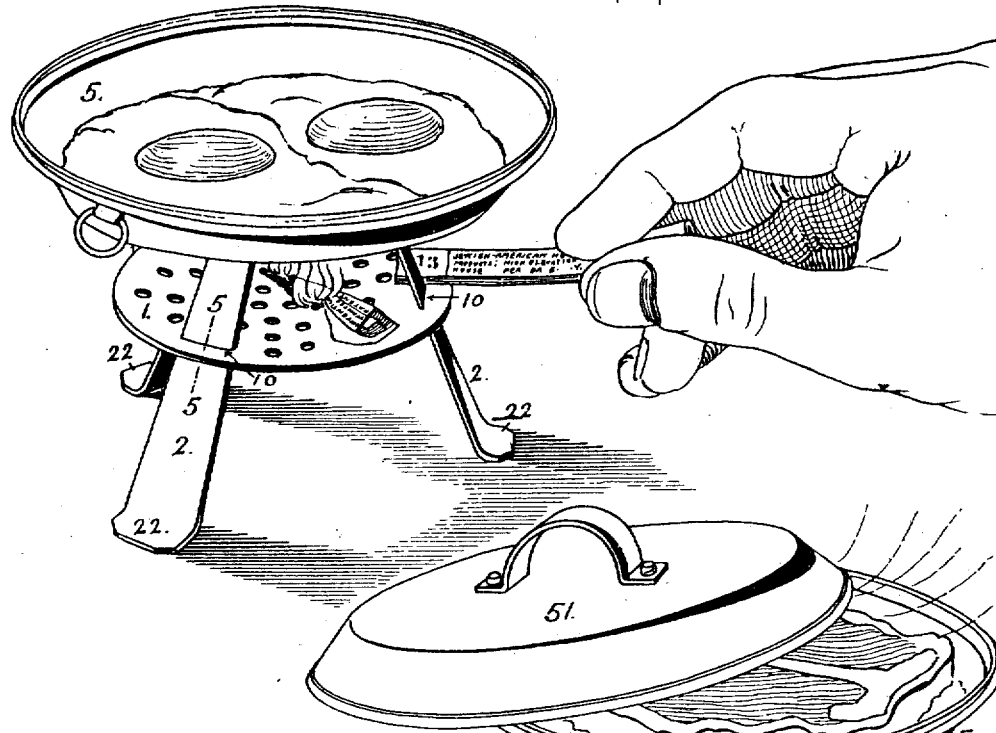
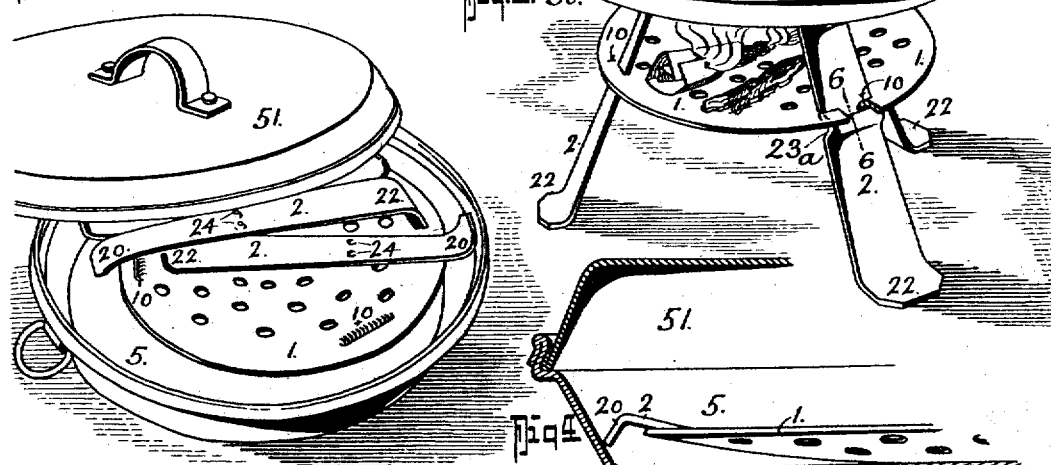

BENJAMIN SCAMARDI, OF WILLIAMSPORT, PENNSYLVANIA.

POCKET-STOVE.

943,569.　　　　　Specification of Letters Patent.　　　Patented Dec. 14, 1909.

Application filed August 26, 1909. Serial No. 514,671.

*To all whom it may concern:*

Be it known that I, BENJAMIN SCAMARDI, residing at Williamsport, in the county of Lycoming and State of Pennsylvania, have invented a new and Improved Pocket-Stove, of which the following is a specification.

My invention relates to improvements in that type of cooking utensils, adapted for the use of tourists, campers, etc. and which are usually foldable for convenient packing, and my said invention primarily has for its object to provide an improved construction of utensil, of the general type stated, that can be very economically made, capable of being folded up for being carried in a coat pocket, and in which the parts are especially designed to be set up for use without the aid of clips or other special fastening or clamping devices.

With other objects in view that will hereinafter appear, my invention comprehends an improved construction and arrangement of a griddle or fuel holding member, a tripod stand therefor, consisting of legs slidably movable through and arranged to support the griddle plate at a suitable point relatively to the upper ends thereof, and with the said ends arranged to removably support a frying or stew pan.

In its still more complete nature, my invention comprehends an improved construction of the griddle or fuel holder and leg members slidably and detachably mountable on the griddle and having means that form stops or rest members for sustaining the griddle and at the same time position the upper ends of the legs to form a level support for the fry or stew pan, the griddle and the legs being relatively so formed that when knocked down they can be easily placed within the stew pan, the cover of the latter and the pan having a rim flange shape for interlocking to form a casing for said parts.

In its still more subordinate features, my invention consists in certain details and novel arrangement of parts, all of which will be hereinafter fully described, specifically pointed out in the appended claims and illustrated in the accompanying drawings in which:

Figure 1, is a perspective view of my stove and illustrates the manner the fuel is fed thereto, the same being arranged for "frying." Fig. 2, is a similar view, the same being arranged for "broiling" and discloses a modified form of leg. Fig. 3, illustrates the manner in which the parts are assembled for packing. Fig. 4, is a detail section and shows how the stew pan and cover members interlock. Fig. 5, is a detail section on the line 5—5 on Fig. 1, and Fig. 6, is a similar view taken on the line 6—6 of Fig. 2 of a slightly modified arrangement of the leg member hereinafter referred to.

In the practical arrangement, all the parts of my invention are formed of sheet metal and preferably stamped up from sheet tin, and the said parts include a griddle plate 1, preferably slightly concaved, and formed with a series of slots 10 near its peripheral edge, three being shown, and these are provided so that the outwardly curved upper ends 20 of the three leg pieces 2—2 can be readily slipped therethrough and the plate 1 slid freely on the upper parts of the said legs, which, when the parts are assembled, form the tripod or support for the stove as is clear from Figs. 1 and 2 and 4 of the drawings, by reference to which it will be noticed the turned out ends 20 form seats for the frying or stew pans that are removably supported thereon a sufficient distance above the plate 1 to give the desired air draft for fuel purposes. By making the legs 2 tapered or wedge-shaped they will tightly fit in the slots 10 and form a good supporting medium. The lower ends of the legs 2 are likewise bent out as at 22 to form solid foot members, as shown.

So far as described, it will be apparent that since the legs 2 are freely slidable through the plate 1, means must be provided to sustain the legs 2 and the plate 1 in a relatively fixed position and to this end each leg 2 has, at like points and about midway their length, indentations 24—24 that form stops or rest members for the plate 1 and prevent its resting unevenly on the legs, and at the same time effects a certain rigidity of the legs 2 that their upper ends maintain a spread position, with the seat portions in substantially the same horizontal plane so that the pan, when placed thereon, will be held straight, so that in frying as shown in Fig. 1 or broiling as in Fig. 2, the gravy will not spill or run over the side.

By providing a griddle plate 1 and joining it with the legs as stated, a very simple and economical contrivance is provided for holding fuel and for sustaining a pan over the griddle in which the parts are substantially held upright without the aid of clips or other fastening means, such as are generally used and required in stoves or utensils of this type. Instead of forming the plate rests 24 on the legs 2 as shown in Fig. 5, the said rest portion can be made more prominent in the larger sizes of my stove and arranged as in Fig. 6, in which case the part 23ª that forms the rest member is made by bending the leg plate 2 transversely and back on itself to the shape shown in Fig. 6. When used for, say, frying eggs, as in Fig. 1 the ordinary type of pie pan 5 is set on top of the legs but when used, say, for broiling a steak, a deeper pan 50 with a lid 51 is used, and in this case, to get the best results, the rim edges of the pan 50 and the lid 51 are made to interlock, see Fig. 4 so as to hold in the vapors from the meat or for keeping the pan and the lid tightly together when the legs and the plate 1 are placed in the pan as understood from Fig. 3.

From the foregoing, taken in connection with the accompanying drawing, the advantages of my invention will be apparent. By reason of forming the griddle and supporting it in the manner stated, I can use the cheapest kind of fuel, ordinary waste newspaper, and by folding the paper in uniform strips and feeding them onto the plate 1 in the manner shown in Fig. 1, I can get the maximum heat generation at a minimum cost, since I have, in practice, learned that with a square foot of newspaper folded into strips as stated, I can fry two eggs, well done and with two feet square of paper cut and folded into uniform shape I can make a steak well done.

So far as I know, in utensils of the type referred to having foldable or detachable legs, special means must be used for holding the parts together when set up. In my invention, this expensive feature is done away with and the necessity of a careful adjustment of the parts is also avoided.

Having thus described my invention, what I claim and desire to protect by Letters Patent is:—

1. A portable pocket stove that comprises a perforated fuel holding plate having a plurality of peripherally arranged slots, leg members slidable through the slots and tightly engaging the ends of said slots, and provided with off-sets that form seats for the plate, and a pan removably mounted on the top of the leg members.

2. A portable pocket stove that comprises the following elements in combination; a perforated fuel holding plate having a plurality of peripherally arranged slots, wedge shaped leg members slidable through and engaging the ends of the slots and provided with off-sets that form seats for the plate to rest upon, the upper and lower ends of the legs being bent outwardly and a pan removably mounted on the out-turned upper ends of the legs.

3. A portable pocket stove comprising a sheet metal perforated plate having a plurality of peripherally arranged slots, leg members slidable through the slots and tightly engaging the ends of the slots, the upper and lower ends of said legs being bent outwardly, said leg members being transversely bent midway their ends to form seats for the perforated plate to rest upon, and a pan removably mounted on the legs as set forth.

4. A portable pocket stove comprising a sheet metal perforated plate having a plurality of peripherally arranged slots, leg members slidable through the slots whose upper and lower ends are bent outwardly, said leg members being transversely bent midway their ends to form seats for the perforated plate to rest upon, and a stew pan removably mounted on the legs, a cover for the said pan, the rim edges of the pan and the cover being arranged to interlock, substantially as shown and described.

5. A pocket stove comprising a griddle or fuel holding member having slots, a tripod stand therefor, consisting of tapered or wedge-like legs slidably movable through said slots and engaging the ends of said slots to support the griddle at a suitable point relatively to the upper ends thereof, and having the upper ends formed to removably support a frying or stew pan.

BENJAMIN SCAMARDI.

Witnesses:
WALTER KAST,
LAWRENCE R. DOHNER.